Patented Jan. 5, 1926.

1,568,044

UNITED STATES PATENT OFFICE.

HARRY P. BASSETT, OF CYNTHIANA, KENTUCKY, AND MONE R. ISAACS, OF PHILADELPHIA, PENNSYLVANIA, ASSIGNORS TO UNITED PRODUCTS CORPORATION OF AMERICA, A CORPORATION OF DELAWARE.

COMPOSITION OF MATTER.

No Drawing.    Application filed November 1, 1922.    Serial No. 598,271.

*To all whom it may concern:*

Be it known that we, HARRY P. BASSETT and MONE R. ISAACS, citizens of the United States, and residents, respectively, of Cynthiana, county of Harrison, and State of Kentucky, and city of Philadelphia, county of Philadelphia, and State of Pennsylvania, have invented a certain new and useful Composition of Matter, of which the following is a specification.

A principal object of our invention is to provide a new and useful composition of matter particularly adapable for use to kill insects, vermin and rodents.

A further object of our invention is to provide an insect, vermin or rodent destroyer which may be sprayed or dusted in its dry state or applied in solution and which will adhere to the surfaces upon which it is deposited.

A further object of our invention is to provide a new composition of matter containing a poisonous ingredient and an adhesive ingredient, adaptable for use either in dry state or in solution.

A further object of our invention is to provide an insecticide adapted for use on vegetation and which will adhere thereto.

A further object of our invention is to provide a new composition of matter containing an insect, vermin or rodent poison in which disintegration of the poisonous ingredient is prevented and its strength maintained.

Other objects of our invention will appear from the following specification.

In our invention we utilize the poisonous properties of an arsenate and we have used calcium diarsenate with very satisfactory results. The adhesive properties in our new composition of matter are supplied by casein or vegetable protein which combine with the free lime of calcium arsenate forming calcium caseinate.

A serious disadvantage in the use hitherto of insecticides, particularly on vegetation, has been due to the falling off or washing off of the insecticide, thus requiring frequent renewals thereof, with consequent increased cost of materials and labor, to prevent damage or destruction of the vegetation by the insects. By our invention we have overcome this disadvantage and the permanent retention of my insecticide upon the surface to which it is applied insures a constant protection of the vegetation against the depredations of insects.

One method of making calcium caseinate is by mixing calcium diarsenate and calcium oxide in proportions of seventy (70) and thirty (30) parts by weight respectively in the presence of water and while this mass is still in moist condition we mix therewith casein or a caseinate solution, a very efficient and desirable composition being produced when the casein used is in the proportion of three (3) parts by weight. However, it will be understood that the proportions may vary widely from those which we have cited as an example and our invention is not to be restricted to any particular proportions or formula. For example, the amount of casein which may be combined with calcium arsenate may be as small as one-fourth of one part or may be as large as ten or more parts, by weight.

It is our belief that in our new composition of matter the arsenate crystal or particle is coated with calcium caseinate which is slightly soluble and that when the composition is sprayed, dusted or otherwise applied to vegetation the moisture inherent therein renders the calcium caseinate slightly soluble whereupon its adhesive properties cause it and the arsenate crystal or particle carried thereby to adhere to the vegetation. And when the composition is applied to vegetation in solution, it will be readily understood that the calcium caseinate having been then rendered slightly soluble will, owing to its adhesive properties, adhere to the surfaces to which it is applied.

The casein also serves to preserve the arsenate as such; arsenates appear to be unstable when exposed to air or subjected to moisture. The casein when combined with the arsenate probably completely encloses the arsenate particle or crystal and thereby protects it from exposure to the air and consequent disintegration or weakening and also from dissolving when subjected to moisture. This preservative feature of our new composition makes it particularly adaptable for use as an insecticide, a vermicide or a rodenticide.

It is to be understood that the materials, their proportions, the number enumerated and the mode of treatment may be suitably varied without departing from the spirit of our invention and the scope of the appended claims.

Having thus described our invention, we claim and desire to protect by Letters Patent of the United States:

1. A composition of matter containing calcium caseinate and an arsenate.

2. A composition of matter containing substantially, by weight, seventy parts of calcium diarsenate, thirty parts of calcium oxide and three parts of casein.

In witness whereof we have hereunto set our hands this 28th day of October, 1922.

HARRY P. BASSETT.
MONE R. ISAACS.